US009755783B2

(12) United States Patent
Sabbarini et al.

(10) Patent No.: US 9,755,783 B2
(45) Date of Patent: Sep. 5, 2017

(54) ABORT BLIND MCH DECODING

(71) Applicant: QUALCOMM Incorporated, San Diego, CA (US)

(72) Inventors: Omar Sabbarini, San Diego, CA (US); Mohammed Tawashi, San Diego, CA (US); Marc Azar, San Diego, CA (US); Pavan Kaivaram, San Diego, CA (US); Meric Uzunoglu, San Diego, CA (US); Sivaramakrishna Veerepalli, San Diego, CA (US); Ramchandran Srinivasan, San Diego, CA (US); Mohan Krishna Gowda, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 14/853,896

(22) Filed: Sep. 14, 2015

(65) Prior Publication Data

US 2017/0079062 A1 Mar. 16, 2017

(51) Int. Cl.
*H04W 72/04* (2009.01)
*H04L 1/00* (2006.01)
*H04W 88/02* (2009.01)

(52) U.S. Cl.
CPC .......... *H04L 1/0046* (2013.01); *H04L 1/0051* (2013.01); *H04L 1/0052* (2013.01); *H04W 88/02* (2013.01)

(58) Field of Classification Search
CPC ............... H04W 80/04; H04W 72/005; H04W 72/1289; H04L 45/16; H04L 12/185
See application file for complete search history.

(56) References Cited

U.S. PATENT DOCUMENTS

| 8,811,253 B2 | 8/2014 | Damnjanovic et al. | |
|---|---|---|---|
| 2007/0223614 A1* | 9/2007 | Kuchibhotla | H04L 1/1887 375/267 |
| 2008/0019307 A1* | 1/2008 | Tenny | H04W 72/005 370/329 |
| 2008/0123648 A1* | 5/2008 | Ooghe | H04L 47/10 370/390 |
| 2008/0198848 A1* | 8/2008 | Yamagishi | H04N 7/17336 370/390 |

(Continued)

FOREIGN PATENT DOCUMENTS

| WO | 2014111157 A1 | 7/2014 |
|---|---|---|
| WO | 2016140755 A1 | 9/2016 |

OTHER PUBLICATIONS

International Search Report and Written Opinion—PCT/US2016/044535—ISA/EPO—dated Oct. 31, 2016.

*Primary Examiner* — Andrew Lee
(74) *Attorney, Agent, or Firm* — Arent Fox LLP

(57) ABSTRACT

In an aspect of the disclosure, a method, a computer-readable medium, and an apparatus are provided. The apparatus may be a UE. The UE determines a failure to receive an MSI for a first MSP. The UE attempts to decode one or more subframes in the first MSP. The UE detects an occurrence of an MSP abort decoding event. The UE determines that the first MSP does not include any subframe that carries MBMS data of an MBMS segment based on the detection of the MSP abort decoding events. The UE aborts the attempt to decode the one or more subframes.

30 Claims, 13 Drawing Sheets

(56) References Cited

U.S. PATENT DOCUMENTS

| | | | |
|---|---|---|---|
| 2008/0247372 A1* | 10/2008 | Chion | H04W 72/005 370/338 |
| 2010/0220643 A1* | 9/2010 | Qi | H04W 72/005 370/312 |
| 2010/0260089 A1* | 10/2010 | Lin | H04W 36/385 370/312 |
| 2012/0163286 A1 | 6/2012 | Huschke et al. | |
| 2012/0213130 A1 | 8/2012 | Zhang et al. | |
| 2012/0236779 A1* | 9/2012 | Lee | H04W 4/08 370/312 |
| 2013/0242716 A1 | 9/2013 | Amerga et al. | |
| 2013/0336189 A1 | 12/2013 | Mandil et al. | |
| 2014/0092720 A1 | 4/2014 | Chakraborty et al. | |
| 2016/0094955 A1* | 3/2016 | Shrivastava | H04W 4/06 370/312 |

\* cited by examiner

ABORT BLIND MCH DECODING

BACKGROUND

Field

The present disclosure relates generally to communication systems, and more particularly, to techniques of aborting blind multicast channel (MCH) decoding in an MCH scheduling period (MSP) when an MCH scheduling information (MSI) for the MSP is lost.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects of the present disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, according to an example, a method of wireless communication of a user equipment (UE) is provided. The method includes determining a failure to receive an MSI for a first MSP. The method includes attempting to decode one or more subframes in the first MSP. The method includes detecting an occurrence of an MSP abort decoding event. The method includes determining that the first MSP does not include any subframe that carries Multimedia Broadcast Multicast Service (MBMS) data of an MBMS segment based on the detection of the MSP abort decoding events. The method includes aborting the attempt to decode the one or more subframes.

According to an example, an apparatus for wireless communication is provided. The apparatus may be a UE. The apparatus includes means for determining a failure to receive an MSI for a first MSP. The apparatus includes means for attempting to decode one or more subframes in the first MSP. The apparatus includes means for detecting an occurrence of an MSP abort decoding event. The apparatus includes means for determining that the first MSP does not include any subframe that carries MBMS data of an MBMS segment based on the detection of the MSP abort decoding events. The apparatus includes means for aborting the attempt to decode the one or more subframes.

According to an example, an apparatus for wireless communication is provided. The apparatus may be a UE. The apparatus includes a memory and at least one processor coupled to the memory and configured to determine a failure to receive an MSI for a first MSP. The at least one processor is further configured to attempt to decode one or more subframes in the first MSP. The at least one processor is further configured to detect an occurrence of an MSP abort decoding event. The at least one processor is further configured to determine that the first MSP does not include any subframe that carries MBMS data of an MBMS segment based on the detection of the MSP abort decoding events. The at least one processor is further configured to abort the attempt to decode the one or more subframes.

According to an example, a computer-readable medium storing computer executable code for wireless communication at a UE is provided. The computer-readable medium includes code for determining a failure to receive an MSI for a first MSP. The computer-readable medium includes code for attempting to decode one or more subframes in the first MSP. The computer-readable medium includes code for detecting an occurrence of an MSP abort decoding event. The computer-readable medium includes code for determining that the first MSP does not include any subframe that carries MBMS data of an MBMS segment based on the detection of the MSP abort decoding events. The computer-readable medium includes code for aborting the attempt to decode the one or more subframes.

DETAILED DESCRIPTION

Figure 1:
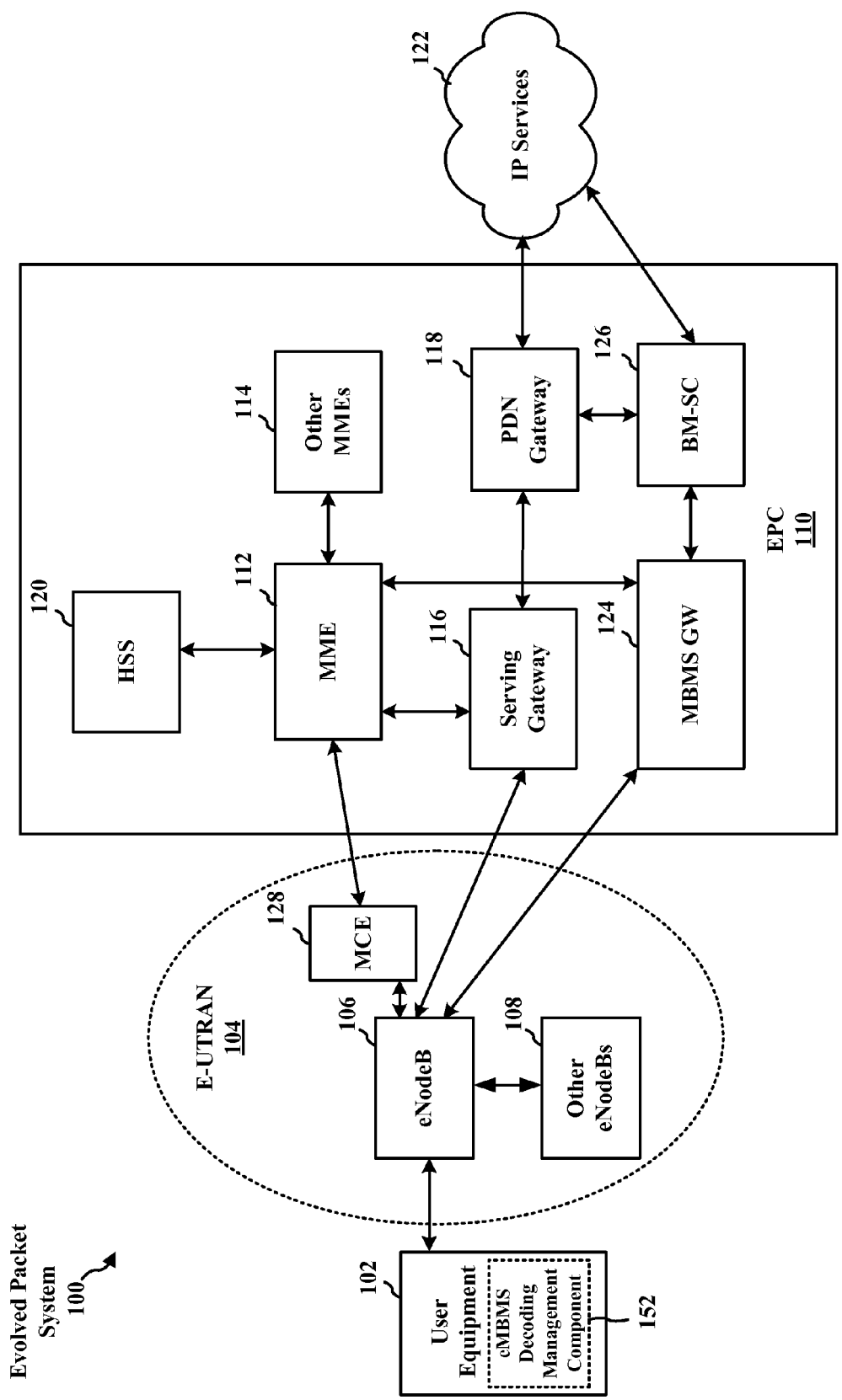
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a public land mobile network (PLMN), and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

In certain configurations, the UE 102 may include an eMBMS decoding management component 152. The eMBMS decoding management component 152 may control a process of determining a failure to receive an MSI for a first MSP. The eMBMS decoding management component 152 may control a process of attempting to decode one or more subframes in the first MSP. The eMBMS decoding management component 152 may also control a process of detecting an occurrence of an MSP abort decoding event. The eMBMS decoding management component 152 may further control a process of determining that the first MSP does not include any subframe that carries MBMS data of an MBMS segment based on the detection of the MSP abort decoding events. The eMBMS decoding management component 152 may control a process of aborting the attempt to decode the one or more subframes.

Figure 2:
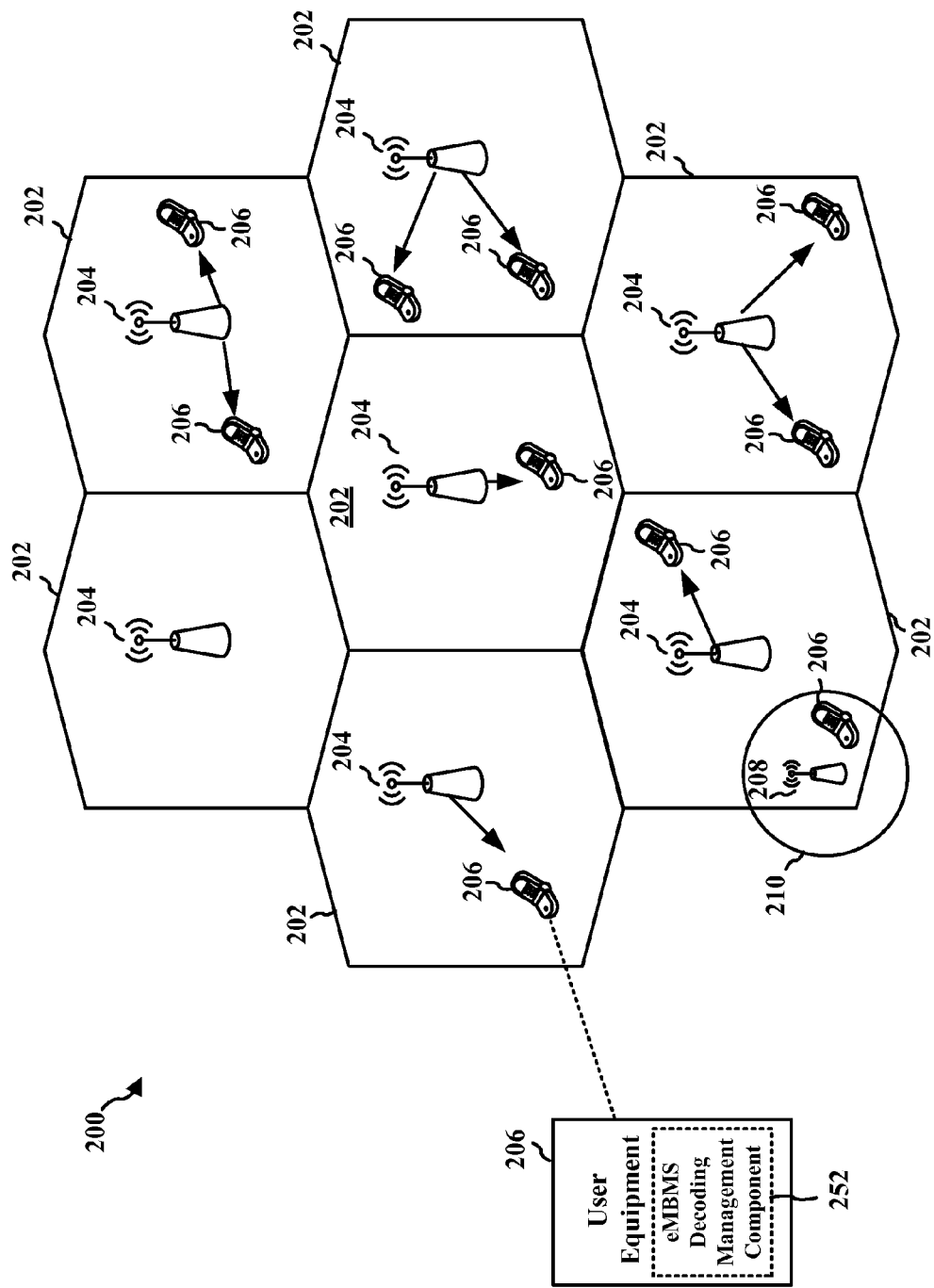
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

In certain configurations, the UE 206 may include an eMBMS decoding management component 252. The eMBMS decoding management component 252 may control a process of determining a failure to receive an MSI for a first MSP. The eMBMS decoding management component 252 may control a process of attempting to decode one or more subframes in the first MSP. The eMBMS decoding management component 252 may also control a process of detecting an occurrence of an MSP abort decoding event. The eMBMS decoding management component 252 may further control a process of determining that the first MSP does not include any subframe that carries MBMS data of an MBMS segment based on the detection of the MSP abort decoding events. The eMBMS decoding management component 252 may control a process of aborting the attempt to decode the one or more subframes.

Figure 3:
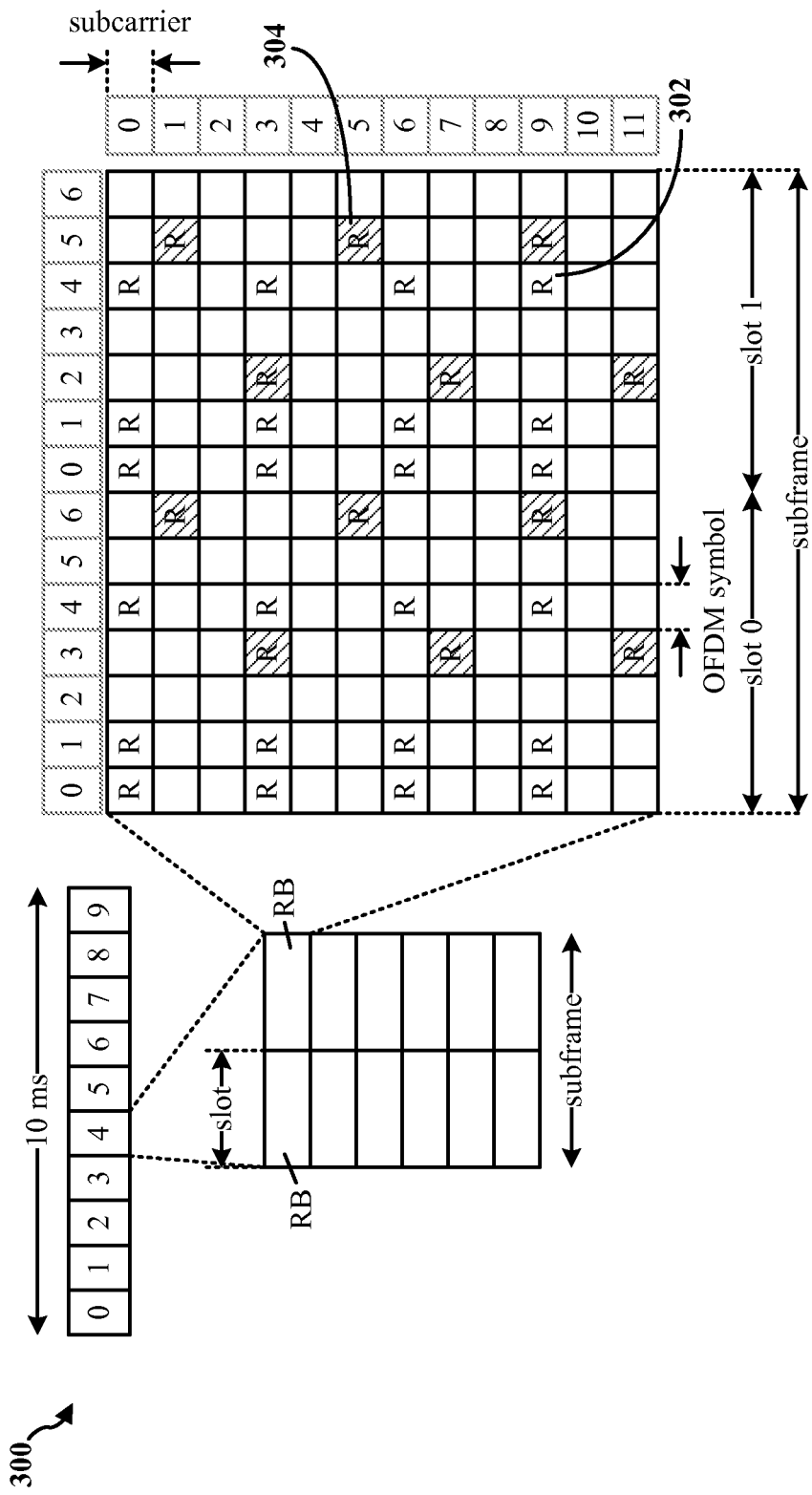
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
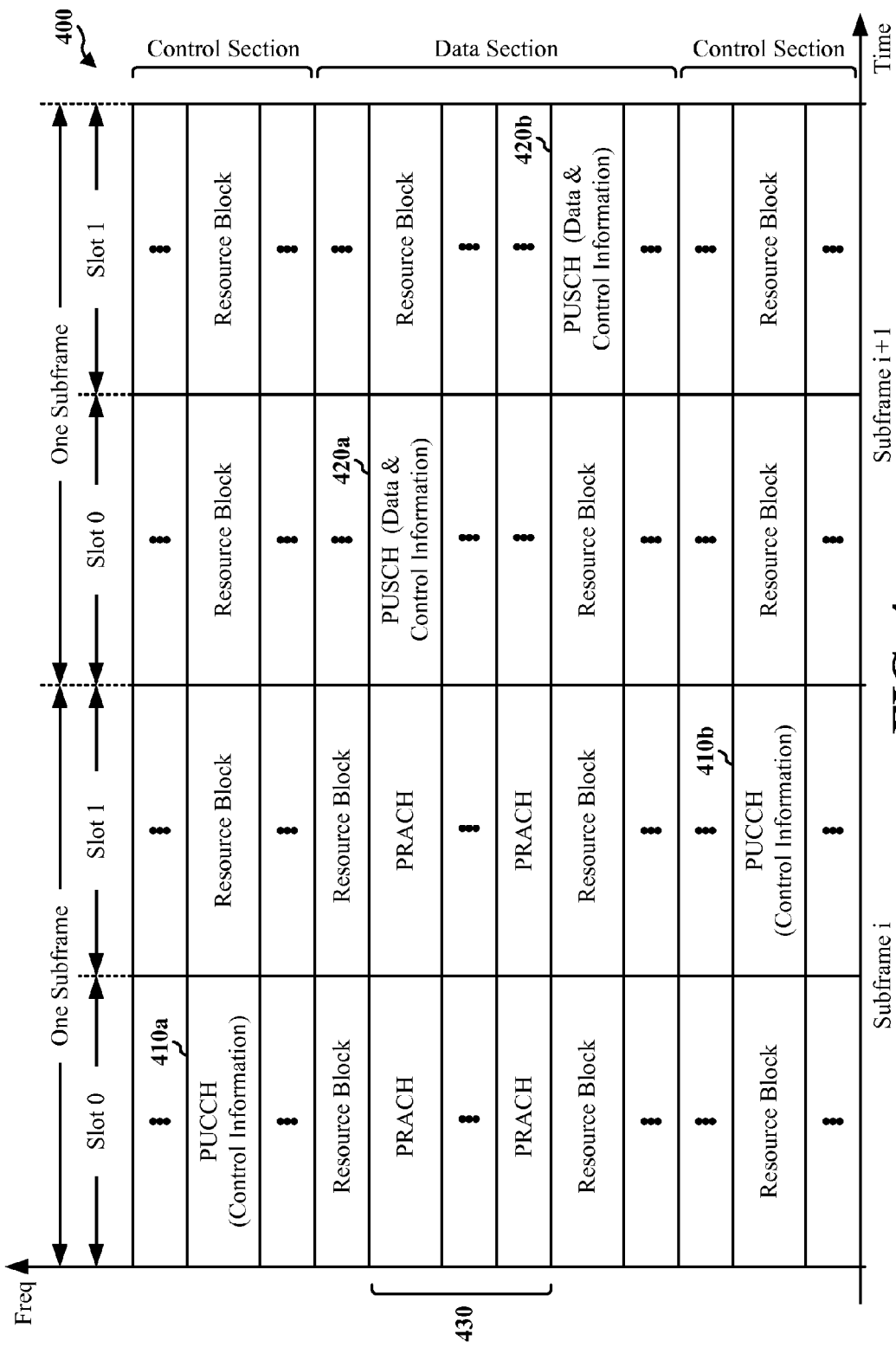
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
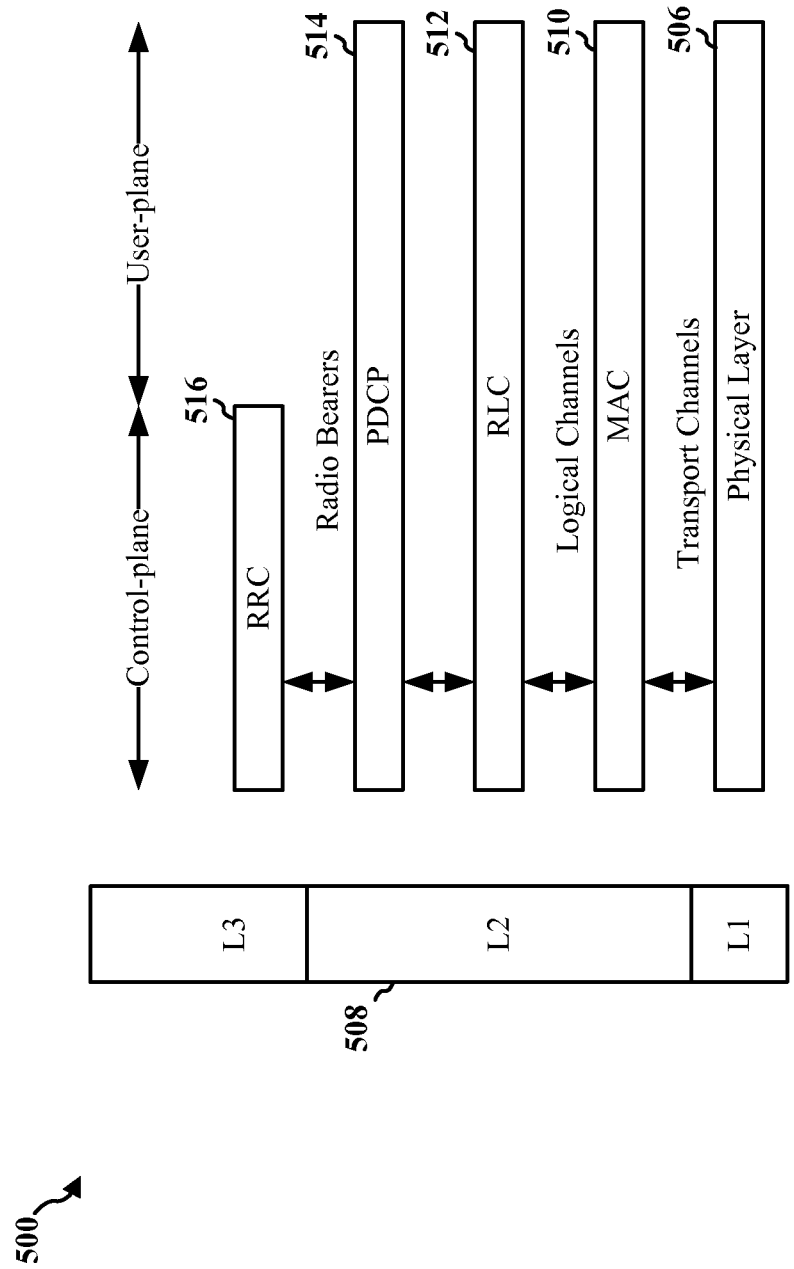
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
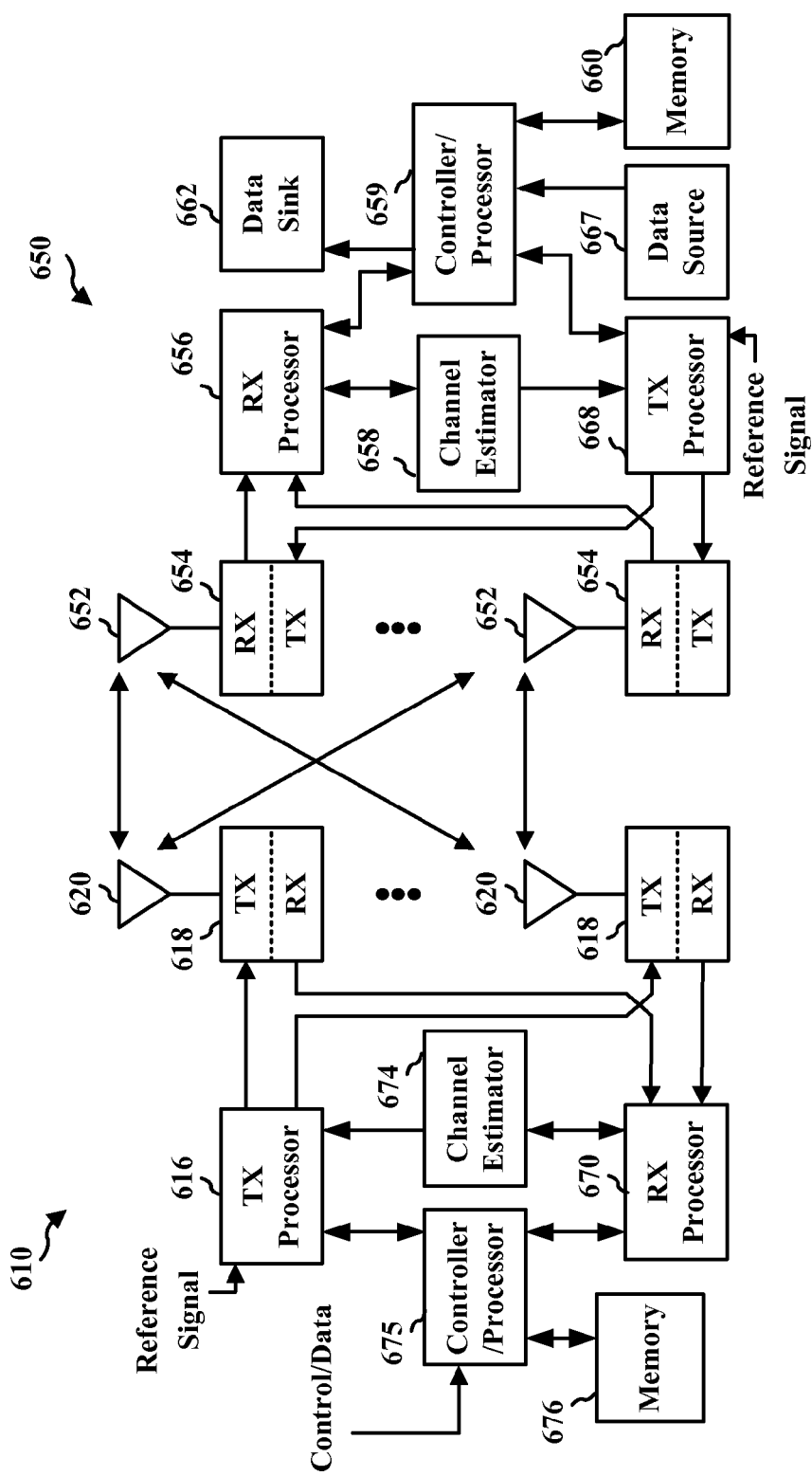
FIG. 6 is a diagram illustrating an example of an evolved Node B (eNodeB) and user equipment (UE) in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figures 7A, 7B:
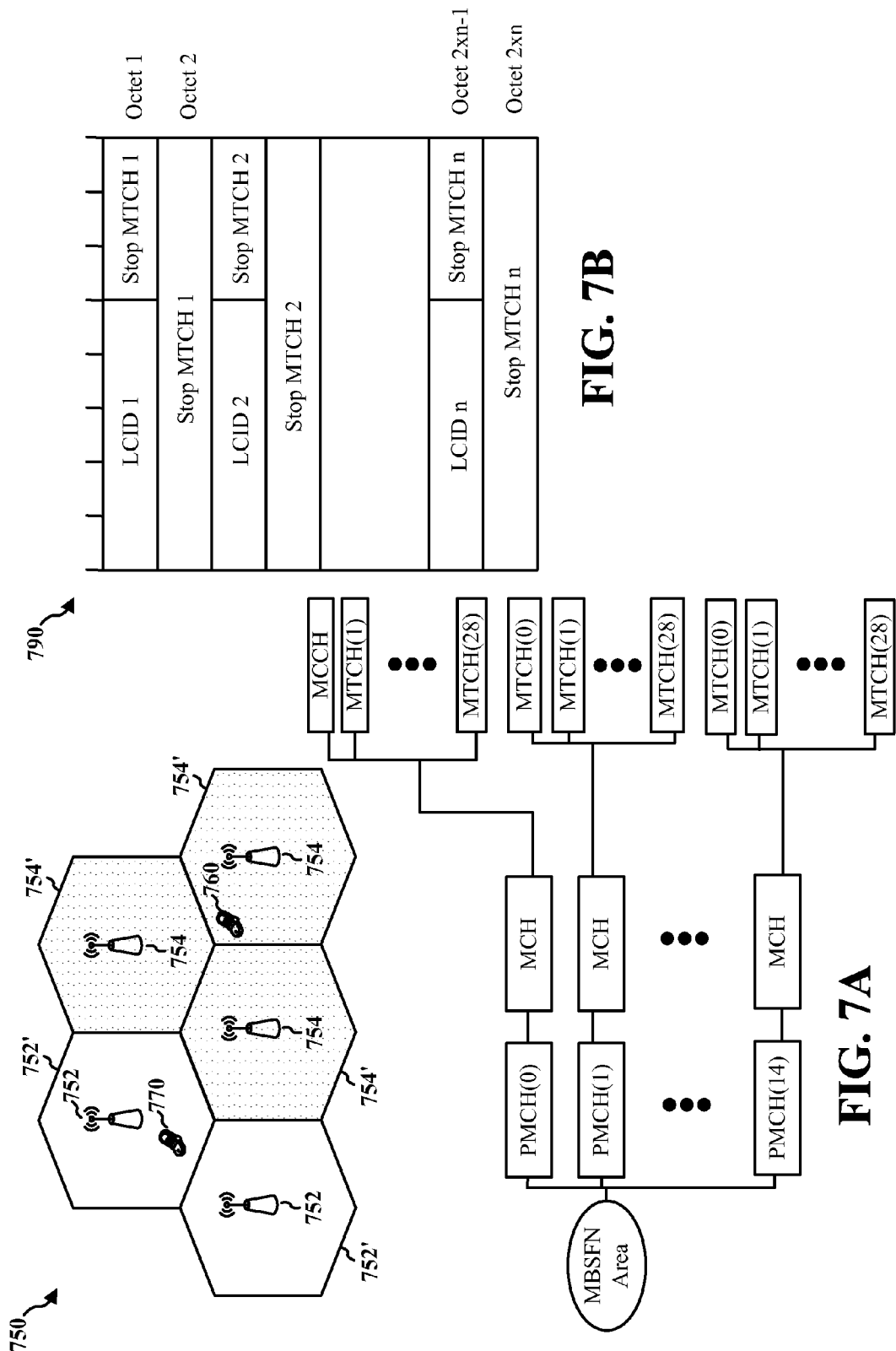
FIG. 7A is a diagram illustrating an example of an evolved Multimedia Broadcast Multicast Service channel configuration in a Multicast Broadcast Single Frequency Network.
FIG. 7B is a diagram illustrating a format of a Multicast Channel Scheduling Information Media Access Control control element.

FIG. 7A is a diagram 750 illustrating an example of an evolved MBMS (eMBMS) channel configuration in an MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and may have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports one or more physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. Initially, the UE may acquire a system information block (SIB) 13 (SIB13). Subsequently, based on the SIB13, the UE may acquire an MBSFN Area Configuration message on an MCCH. Subsequently, based on the MBSFN Area Configuration message, the UE may acquire an MCH scheduling information (MSI) MAC control element. The SIB13 may include (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 7B is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area.

Figure 8:
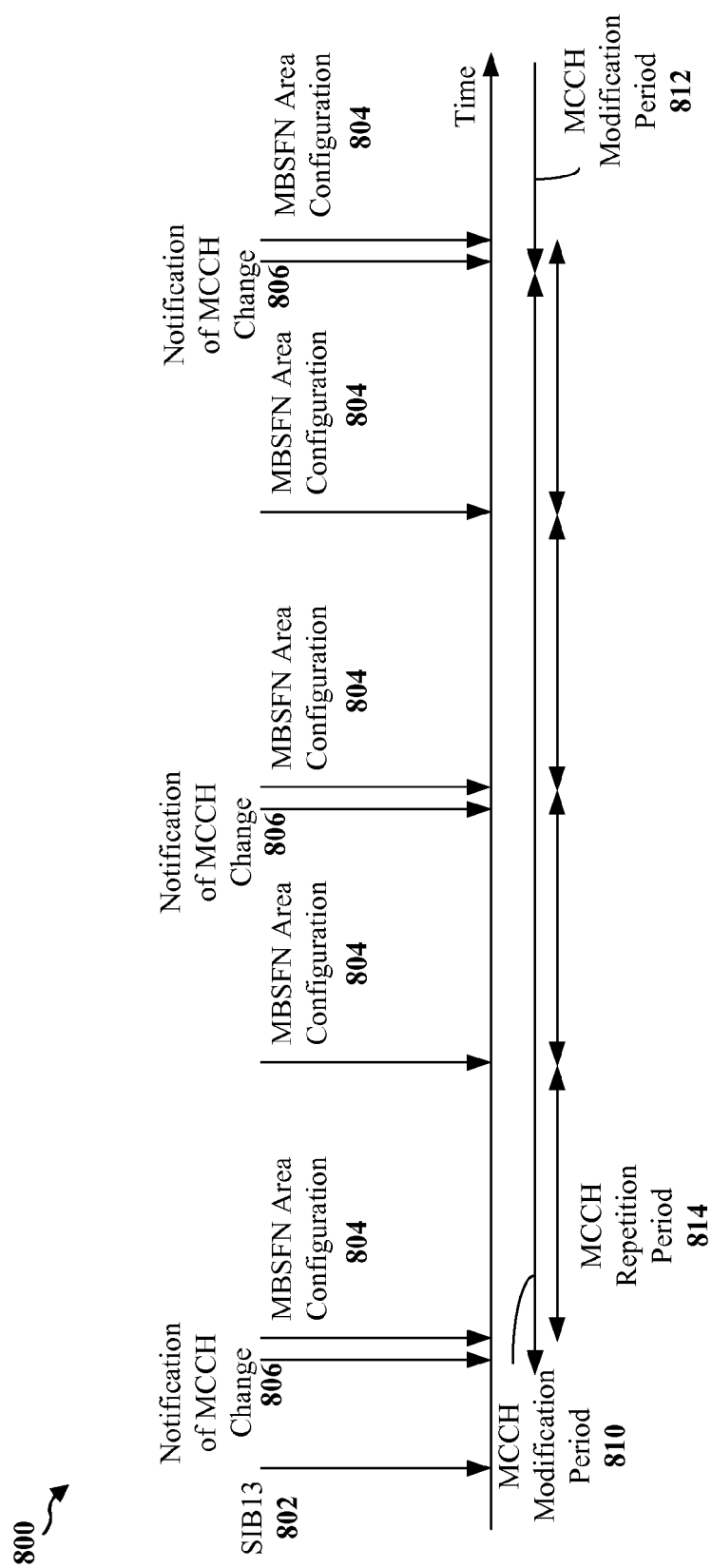
FIG. 8 is a diagram illustrating reception of some eMBMS content.

FIG. 8 is a diagram 800 for illustrating the reception of some eMBMS content. The eMBMS content includes control/system information such as a system information block 13 (SIB13), MCCH, MCH scheduling information (MSI), notification of MCCH change messages, traffic data such as MTCH(s), and other eMBMS related content. As shown in FIG. 8, a UE receives a SIB13 802. The SIB13 indicates the MBSFN area identifier (ID) of each MBSFN supported by the cell, non-MBSFN region length (1 or 2 symbols) per MBSFN area, an MCCH configuration per MBSFN area for receiving the MCCH and the MBSFN area configuration message 804 in the MCCH, and notification information for receiving the notification of MCCH change 806. The MBSFN area configuration message 804 is received each MCCH repetition period 814. The notification of MCCH change 806 and MBSFN area configuration 804 messages received in the MCCH modification period 810 apply in the subsequent MCCH modification period 812. While not shown in FIG. 8, a UE may receive MTCH(s) (i.e., traffic data) along with eMBMS control/system information.

Figure 9:
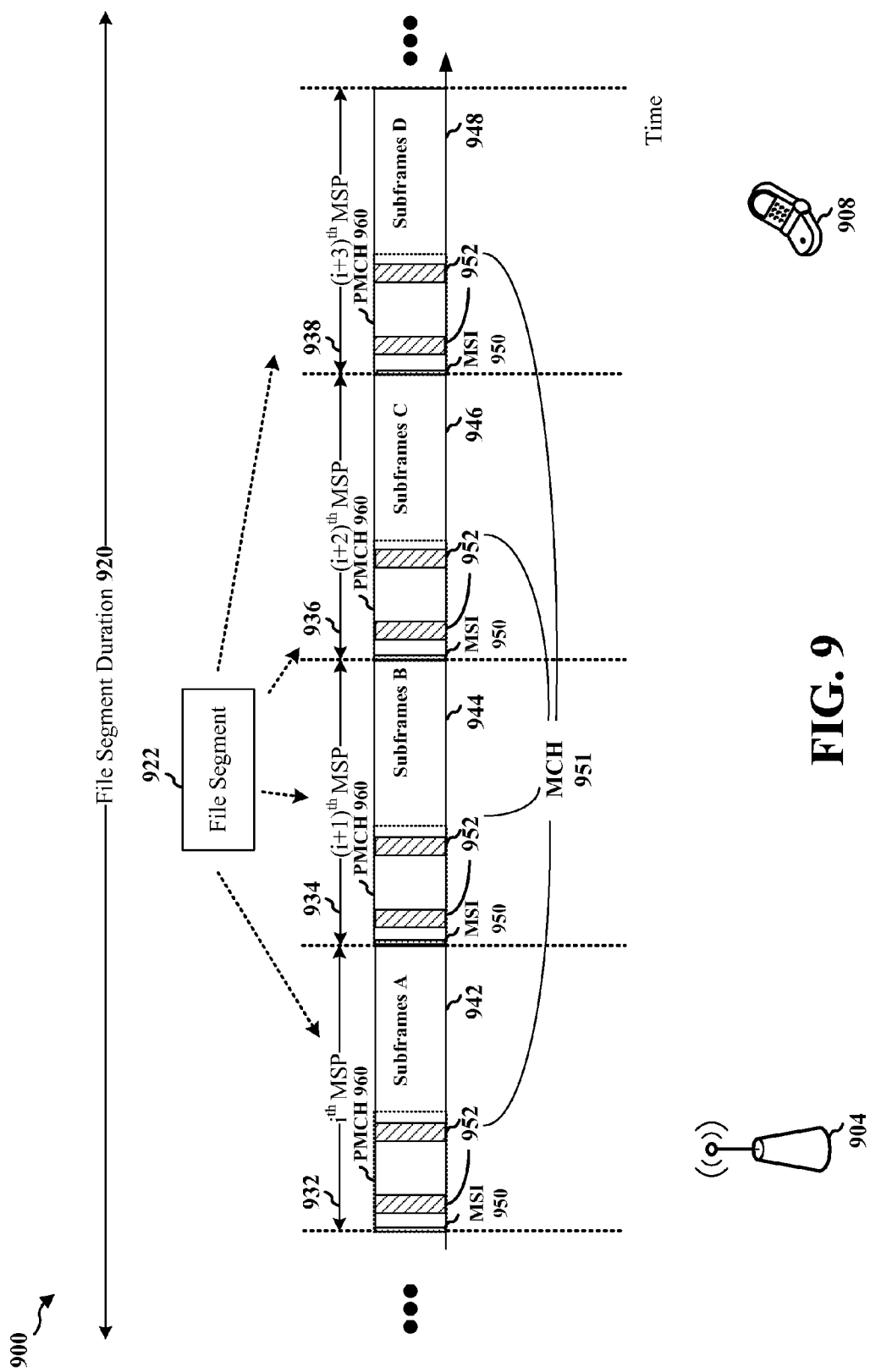
FIG. 9 is a diagram illustrating that a UE receives eMBMS subframes from an eNodeB.

FIG. 9 is a diagram 900 illustrating that a UE receives eMBMS subframes from an eNodeB. As shown, an eNodeB 904 uses an eMBMS service to deliver a file segment 922 to a UE 908 in an eMBMS session. For example, the file segment 922 may be an audio/video file. The eNodeB 904 may allocate an file segment duration 920 for transmitting the file segment 922. As an example, the file segment duration 920 may be 2 seconds. The file segment duration 920 may include one or more MSPs. For simplicity and clarity, FIG. 9 shows $i^{th}$ to $(i+3)^{th}$ MSPs in the file segment duration 920. In this example, the MSP may be 320 ms. Respective subframes A-D 942, 944, 946, 948 may be transmitted in the $i^{th}$ to $i+3^{th}$ MSPs 932-938. One or more subframes 952 of each of the subframes A-D 942, 944, 946, 948 may be allocated to an MCH 951 that carries eMBMS service data of the file segment 922. The MCH 951 may include MCCH and MTCH multiplexed in the MCH 951. Further, the MCH 951 may be mapped in to a PMCH 960 in each of the $i^{th}$ to $i+3^{th}$ MSPs 932-938.

At the beginning of each of the $i^{th}$ to $i+3^{th}$ MSPs 932-938, the eNodeB 904 may use a MAC control element to transmit an MSI 950. The MSI 950 indicates which subframes are used for the MCH 951 in the upcoming MSP. In other words, the MSI 950 in each of the $i^{th}$ to $i+3^{th}$ MSPs 932-938 indicates the location the subframes 952 allocated for the MCH 951 in that MSP. Accordingly, the UE 908 may decode only the subframes 952 allocated for the MCH 951, which may carry the MCH 951, in the subframes A-D 942, 944, 946, 948 based on the MSI 950, and not the subframes not carrying the MCH 951. An exemplary MSI is shown in FIG. 7B.

In certain circumstances, due to channel error or RF tune away (e.g., to monitor CDMA2000 1×RTT paging channel), the UE 908 may not be able to detect and decode the MSI 950. That is, from the perspective of the UE 908, the MSI 950 is lost. Consequently, the UE 908 may need to perform blind decoding for all subframes transmitted in the PMCH 960 or in the associated MSP in order to detect and decode the subframes carrying the MCH 951.

In a typical eMBMS service data (e.g., live video) streaming session, the data volume for each file segment 922 may vary. To cover peak bandwidth, the eNodeB 904 may over-provision subframes in an MSP. The eNodeB 904 may end the transmission of the file segment 922 earlier than the file segment duration 920 allocated for the file segment 922. In this example, the eNodeB 904 may finish transmission of the eMBMS service data in the $(i+1)^{th}$ MSP 934 and may not send any eMBMS service data in the $(i+2)^{th}$ MSP 936, the $(i+3)^{th}$ MSP 938, and the subsequent MSPs in the file segment duration 920. Accordingly, the eNodeB 904 indicates in the respective MSI 950 of the $(i+2)^{th}$ MSP 936 and the $(i+3)^{th}$ MSP 938 that no subframe in the MSP carries the MCH 951. Accordingly, the UE 908 may not to decode any subframes in the $(i+2)^{th}$ MSP 936 and the $(i+3)^{th}$ MSP 938. However, if the UE 908 is not able to detect and decode the MSI 950 in the $(i+2)^{th}$ MSP 936 or the $(i+3)^{th}$ MSP 938, the UE 908 would not know that the $(i+2)^{th}$ MSP 936 or the $(i+3)^{th}$ MSP 938 does not carry the MCH 951. Consequently, the UE 908 may still perform blind decoding for all the subframes in the $(i+2)^{th}$ MSP 936 or the $(i+3)^{th}$ MSP 938 in order to detect the MCH 951, but without getting any eMBMS service data.

As an example, the UE 908 may not able to detect and decode the MSI 950 in the $(i+3)^{th}$ MSP 938 (i.e., the MSI 950 is lost). In certain configurations, the UE 908 may initially continue performing blind decoding the subframes D 948 from the beginning of the PMCH 960 or the $(i+3)^{th}$ MSP 938. The UE 908 then may attempt to detect an MSP abort decoding event and may abort the blind decoding when an MSP abort decoding event is detected. Although the eNodeB 904 has finished transmitting the eMBMS service data on the MCH 951, the subframes 952 allocated for the MCH 951 in the $(i+3)^{th}$ MSP 938 are still allocated to the MCH 951. As a result, the subframes 952 allocated for the MCH 951 of the $(i+3)^{th}$ MSP 938 may be empty subframes, as the eNodeB 904 may not transmit any symbols in the subframes 952 allocated for the MCH 951 of the $(i+3)^{th}$ MSP 938.

The subframes in the $(i+3)^{th}$ MSP 938 that are not subframes 952 allocated for the MCH 951 may be used for other transmission. For some of these subframes, the UE 908 may be able to decode at least a part of such a subframe and accordingly to determine that the subframe is not directed to the UE 908. For some other of these subframes, the UE 908 may not be able to decode such a subframe at all, but the UE 908 can accordingly determine that the subframe is not directed to the UE 908. When the UE 908 attempts to decode the initial subframe of the subframes 952 allocated for the MCH 951 in the $(i+3)^{th}$ MSP 938, the UE 908 encounters a decoding error, because there may be no symbol (or signal) in the that subframe. That is, the UE 908 detects no signal in the subframe. The UE 908 then attempts to decode the next subframe of the subframes 952 allocated for the MCH 951. The UE 908 encounters another decoding error, because there may be no symbol in the next subframe, either. The UE 908 may attempt to decode any following subframes. The UE 908 may determine, or may be configured with, a parameter N. When the UE 908 determines that it has encountered decoding errors in N consecutive subframes (i.e., an MSP abort decoding event), then UE can decide to abort the blind decoding of the current MSP (i.e., $(i+3)^{th}$ MSP 938). In other words, after encountering decoding errors in N consecutive subframes, the UE 908 may determine that the N connectives subframes are part of the subframes 952 allocated for the MCH 951 and that the subframes 952 allocated for the MCH 951 do not carry the eMBMS service data. N may be a function of an MBSFN allocation in the $(i+3)^{th}$ MSP 938 or a duration of the PMCH 960 in the $(i+3)^{th}$ MSP 938, or a combination thereof. For example, N may not be greater than the number of subframes allocated for the PMCH 960.

Alternatively or in addition, the UE 908 may measure the signal-to-noise ratio (SNR) in each subframes of the $(i+3)^{th}$ MSP 938. The UE 908 may determine, or may be configured with, a threshold T. If the measured SNR is below the threshold T for N consecutive subframes, the UE 908 may determine that the N connectives subframes are part of the subframes 952 allocated for the MCH 951 and that the subframes 952 allocated for the MCH 951 do not carry the eMBMS service data. Accordingly, then UE can decide to abort the blind decoding of the current MSP (i.e., $(i+3)^{th}$ MSP 938). The threshold T may be a function of an MBSFN allocation in the $(i+3)^{th}$ MSP 938 or a duration of the PMCH 960 in the $(i+3)^{th}$ MSP 938, or a combination thereof. The threshold T is determined in consideration to avoid deep fading in the subframes 952 allocated for the MCH 951 from the adjacent subframes. The threshold T may be below zero, e.g., −10 dB or −15 dB.

When the UE 908 determines that a particular MSP, based on the MSI 950 in that particular MSP, does not carry the MCH 951, the UE 908 may also determine that the transmission of the file segment 922 has been completed and the MSPs in the file segment duration 920 subsequent to the particular MSP will not carry the MCH 951 for the file segment 922. In certain configurations, when the UE 908 determines that the MSI 950 is lost in the $(i+3)^{th}$ MSP 938, the UE 908 further determines whether the $(i+2)^{th}$ MSP 936 has the MCH 951 carrying the eMBMS service data. For example, the UE 908 may determine whether the MSI 950 in the $(i+2)^{th}$ MSP 936 indicates that the $(i+2)^{th}$ MSP 936 has the MCH 951 carrying the eMBMS service data. The UE 908 may only initiate the detection of the MSP abort decoding event (e.g., the occurrence a decoding error in each of N consecutive subframes) and the corresponding abort procedure in the $(i+3)^{th}$ MSP 938 when the previous MSP (i.e., the $(i+2)^{th}$ MSP 936) does not have the MCH 951 carrying the eMBMS service data.

In certain configurations, the eMBMS service layer of the UE 908 can determine the start of the transmission of the file segment 922 (i.e., the start of the file segment duration 920) based on information received from the eNodeB 904. For example, the UE 908 may receive a media presentation description (MPD) that describes the file segment 922. The eMBMS service layer can determine at which MSP to start the reception of the file segment 922.

The UE 908 can determine a total number M of MSPs allocated in the file segment duration 920 based on the file segment duration 920 and the duration of the MSP. That is, M=FLOOR(Segment Duration/MSP). In this example, the file segment duration 920 is 2 seconds and the duration of the MSP is 0.32 second. M=FLOOR(2/0.32)=6. Thus, the file segment duration 920 includes 6 MSPs.

When the UE 908 determines that a particular MSP, based on the MSI 950 in that particular MSP, does not carry the MCH 951, the UE 908 may also determine that the transmission of the file segment 922 has been completed and the MSPs in the file segment duration 920 subsequent to the particular MSP will not carry the MCH 951 for the file segment 922. Therefore, the UE 908 may not need to perform blind decoding for a subsequent MSP if the MSI 950 is lost for that subsequent MSP.

As an example, the UE 908 may start a counter to record the number of MSPs has elapsed in the file segment duration 920. More particularly, at the beginning of the initial MSP (i.e., the first MSP) in the file segment duration 920, the value of the counter may be set to 1. After an MSP has elapsed, i.e., at the beginning of the second MSP, the value of the counter of may be set to 2. Further, the UE 908 may receive the MSI 950 in the $(i+2)^{th}$ MSP 936 and the MSI 950 indicates that MCH 951 is not transmitted in the $(i+2)^{th}$ MSP 936. Thus, the UE 908 does not decode any subframes in the $(i+2)^{th}$ MSP 936 to obtain MCH 951. Based on the counter value in the $(i+2)^{th}$ MSP 936, the UE 908 can determine a number L of MSPs left in the file segment duration 920. The UE 908 may determine to skip blind decoding for an MSP of the L consecutive MSPs subsequent to the $(i+2)^{th}$ MSP 936 if the MSI 950 is lost in the MSP. The UE 908 may resume decoding at the beginning of the next segment duration.

In this example, i may be 2. As described supra, the file segment duration 920 may include 6 MSPs. As such, in this example, the UE 908 determines in the $4^{th}$ MSP (i.e., the $(i+2)^{th}$ MSP 936) that the $5^{th}$ MSP and the $6^{th}$ MSP do not carry the MCH 951 and that the UE 908 does not need to perform blind decoding in the $5^{th}$ MSP or the $6^{th}$ MSP if the MSI 950 is lost in the $5^{th}$ MSP or the $6^{th}$ MSP. In the $(i+3)^{th}$ MSP 938, the UE 908 may not be able to detect and decode the MSI 950 for reasons described supra. As the UE 908 has determined that the transmission of the file segment 922 had completed in the $(i+2)^{th}$ MSP 936, the UE 908 can determine that the current MSP (i.e., the $(i+3)^{th}$ MSP 938) is within the MSPs that do not have the MCH 951 carrying the eMBMS service data (i.e., an MSP abort decoding event). Accordingly, the UE 908 may decide not to perform blind decoding for the subframes in the $(i+3)^{th}$ MSP 938.

In certain configurations, when the UE 908 is not able to detect and decode the MSI 950 in an MSP as described supra, the UE 908 may monitor the control region of the subframes in the MSP to determine whether the eNodeB 904 has re-allocated certain subframes to unicast transmission (i.e., an MSP abort decoding event). When the UE 908 detects that certain subframes have been re-allocated, the UE 908 can determine that the eNodeB 904 has re-allocated the subframes that otherwise would be empty. The otherwise empty subframes may be due to that the eNodeB 904 has completed the transmission of the file segment 922 and that the empty subframes were allocated to MCH 951 to carry the eMBMS service data of the file segment 922. That is, the eNodeB 904 can determine that no more eMBMS service data of the MCH 951 will be transmitted in those allocated subframes and, thus, may decide to re-allocated those subframes to unicast transmission. For example, when the UE 908 detects that the PDCCH in the control region of a particular subframe uses downlink control information (DCI) format 2C, the UE 908 may determine that the particular subframe will be transmitted in transmission mode 9, which may utilize spatial multiplexing using demodulation reference signal (DM-RS) or UE-RS. Further, when the UE 908 detects that the PDCCH in the control region of a particular subframe uses DCI format 2D, the UE 908 may determine that the particular subframe will be transmitted in transmission mode 10, which may also utilize spatial multiplexing using DM-RS or UE-RS.

In this example, when the UE 908 is not able to detect and decode the MSI 950 in the $(i+3)^{th}$ MSP 938, the UE 908 initially performs blind decoding of the subframes in the $(i+3)^{th}$ MSP 938. Subsequently, the UE 908 may detect that the PDCCH of a particular subframe in the $(i+3)^{th}$ MSP 938 uses DCI format 2C or 2D corresponding to Transmission Mode 9 or Transmission Mode 10. The UE 908 may determine that the particular subframe is part of the subframes 952 allocated for the MCH 951. The UE 908 may also determine that the eNodeB 904 has reallocated the particular subframe to unicast transmission because the eNodeB 904 has completed the transmission of the file segment 922. Accordingly, the UE 908 can decide to abort the blind decoding.

As described supra, when the UE 908 determines that a particular MSP, based on the MSI 950 in that particular MSP, does not carry the MCH 951, the UE 908 may also determine that the transmission of the file segment 922 has been completed and the MSPs in the file segment duration 920 subsequent to the particular MSP will not carry the MCH 951 for the file segment 922. In certain configurations, when the UE 908 determines that the MSI 950 is lost in the $(i+3)^{th}$ MSP 938, the UE 908 further determines whether the $(i+2)^{th}$ MSP 936 has the MCH 951 carrying the eMBMS service data. For example, the UE 908 may determine whether the MSI 950 in the $(i+2)^{th}$ MSP 936 indicates that the $(i+2)^{th}$ MSP 936 has the MCH 951 carrying the eMBMS service data. The UE 908 may only initiate the detection of the MSP abort decoding event (e.g., the occurrence DCI format 2C/2D in PCCCH) and the corresponding abort procedure in the $(i+3)^{th}$ MSP 938 when the previous MSP (i.e., the $(i+2)^{th}$ MSP 936) does not have the MCH 951 carrying the eMBMS service data.

Figure 10:
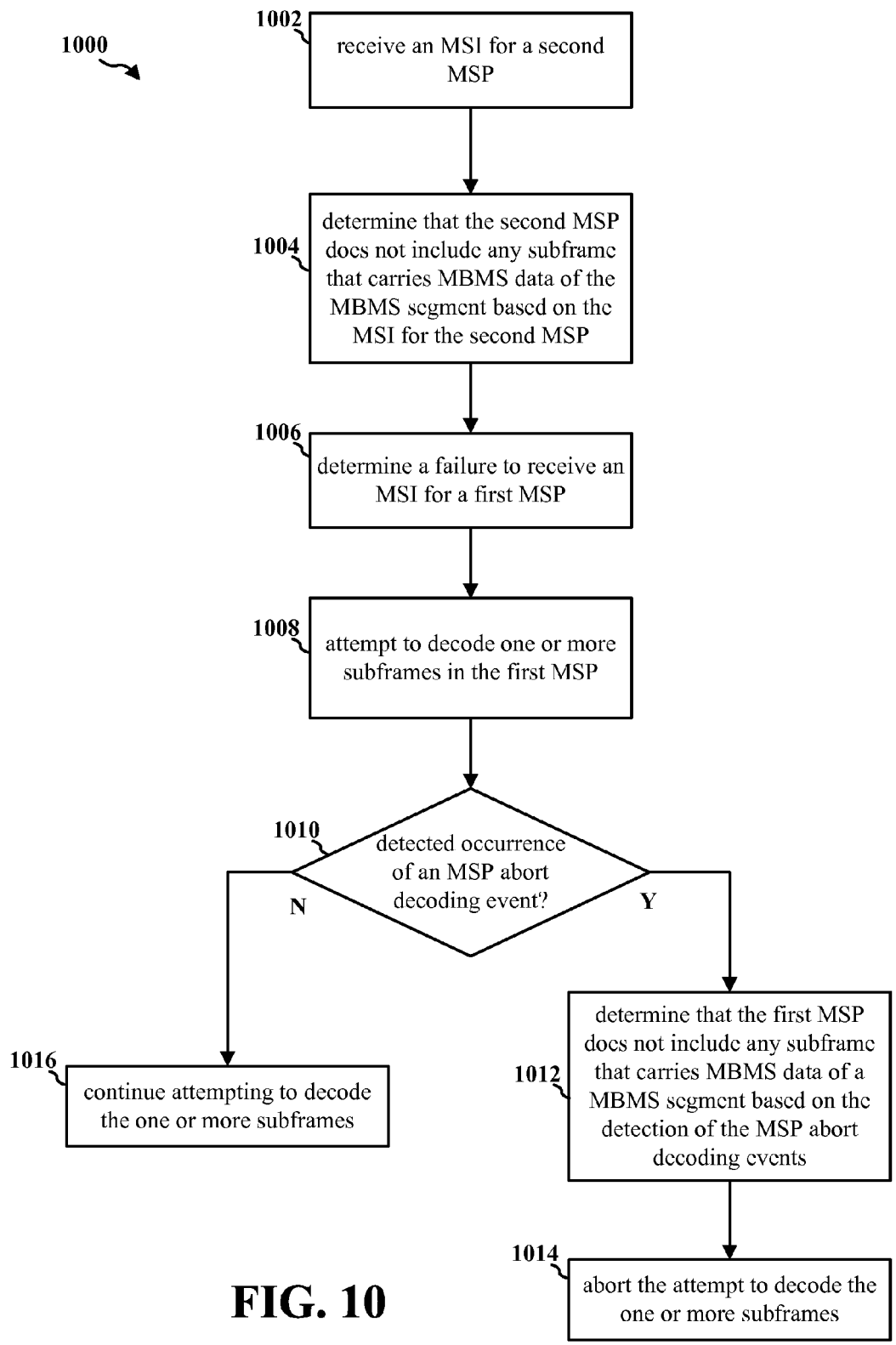
FIG. 10 is a flow chart 1000 of a method (process) of an MSP decoding procedure.

FIG. 10 is a flow chart 1000 of a method (process) of an MSP decoding procedure. The method may be performed by an apparatus. The apparatus may be a UE (e.g., the UE 102, the UE 206, the apparatus 1202/1202'). In certain configurations, at operation 1002, the UE receives an MSI for a second MSP. At operation 1004, the UE determines that the second MSP does not include any subframe that carries MBMS data of the MBMS segment based on the MSI for the second MSP. For example, referring to FIG. 9, the UE 908 receives the MSI 950 in the $(i+2)^{th}$ MSP 936. The UE 908 may determine that the MSI 950 in the $(i+2)^{th}$ MSP 936 indicates that the $(i+2)^{th}$ MSP 936 does not have the MCH 951 carrying the eMBMS service data.

At operation 1006, the UE determines a failure to receive an MSI for a first MSP. The second MSP is prior to and consecutive to the first MSP. For example, referring to FIG. 9, the UE 908 may not be able to detect and decode the MSI 950 in the $(i+3)^{th}$ MSP 938. At operation 1008, the UE attempts to decode one or more subframes in the first MSP. For example, referring to FIG. 9, the UE 908 may initially continue performing blind decoding the subframes D 948 from the beginning of the PMCH 960 or the $(i+3)^{th}$ MSP 938.

At operation 1010, the UE determines whether it has detected an occurrence of an MSP abort decoding event. In certain configurations, the detection of the occurrence of the MSP abort decoding event includes one or more of procedures 1010-a, 1010-a, 1010-c, 1010-d shown in FIG. 11. In certain configurations, the detection of the occurrence of the MSP abort decoding event is performed in response to the determination that the second MSP does not include any subframe that carries MBMS data of the MBMS segment. For example, referring to FIG. 9, the UE 908 may detect the occurrence a decoding error in each of N consecutive subframes or the occurrence DCI format 2C/2D in PCCCH of a subframe in the $(i+3)^{th}$ MSP 938.

When the UE has detected an occurrence on an MSP abort decoding event in operation 1010, the UE, at operation 1012, determines that the first MSP does not include any subframe that carries MBMS data of an MBMS segment. Subsequent to operation 1012, the UE, at operation 1014, aborts the attempt to decode the one or more subframes. When the UE has not detected an occurrence in operation 1010, the UE, at operation 1016, may continue attempting to decode the one or more subframes in the first MSP.

Figure 11:
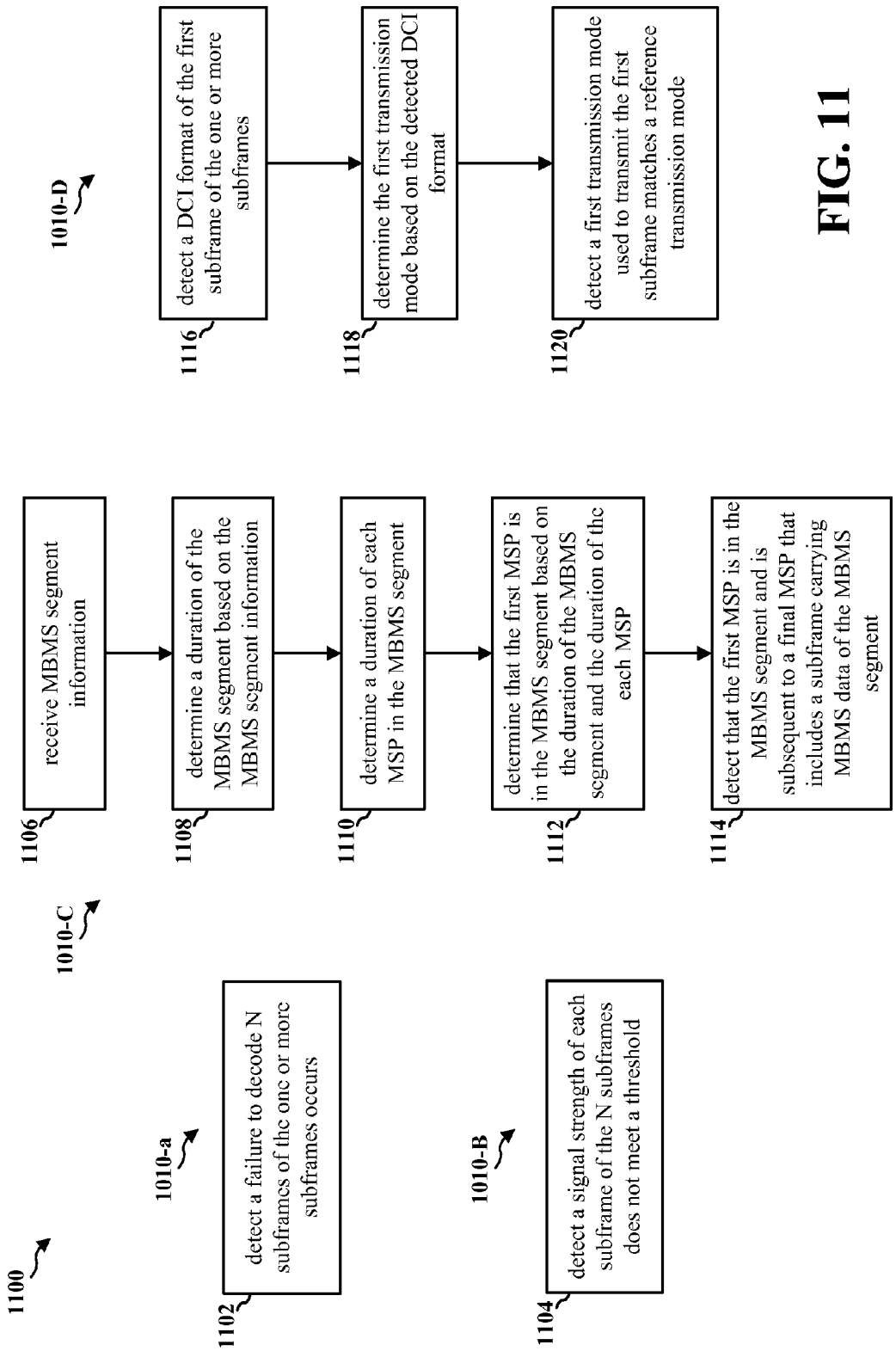
FIG. 11 are flow charts illustrating procedures for detecting an occurrence of the MSP abort decoding event.

FIG. 11 are flow charts illustrating procedures 1010-a, 1010-a, 1010-c, 1010-d for the detection of the occurrence of the MSP abort decoding event performed in operation 1010. The procedure 1010-a includes operation 1102, in which the UE detects a failure to decode N subframes of the one or more subframes occurs. N is an integer greater than 1. In certain configurations, the failure to decode the each subframe of the N subframes occurs when no signal is detected in the each subframe of the N subframes. For example, referring to FIG. 9, the UE 908 may detect an MSP abort decoding event when the UE 908 encounters a decoding error (e.g., detects no signals) in each of N consecutive subframes in the $(i+3)^{th}$ MSP 938.

The procedure 1010-b includes operation 1104, in which the UE detects a signal strength of each subframe of the N subframes does not meet a threshold. In certain configurations, each of N and the threshold is a function of an MBSFN allocation in the first MSP, a duration of a PMCH in the first MSP, or a combination thereof. For example, referring to FIG. 9, the UE 908 may detect an MSP abort decoding event when the UE 908 detects an SNR below the threshold T in each of N consecutive subframes in the $(i+3)^{th}$ MSP 938.

Within the procedure 1010-c, the UE, at operation 1106, receives MBMS segment information. At operation 1108, the UE determines a duration of the MBMS segment based on the MBMS segment information. At operation 1110, the UE determines a duration of each MSP in the MBMS segment. At operation 1112, the UE determines that the first MSP is in the MBMS segment based on the duration of the MBMS segment and the duration of the each MSP. At operation 1114, the UE detects that the first MSP is in the MBMS segment and is subsequent to a final MSP that includes a subframe carrying MBMS data of the MBMS segment. In certain configurations, the second MSP of the operation 1004 is the final MSP. For example, referring to FIG. 9, the file segment duration 920 may include 6 MSPs. In the $(i+3)^{th}$ MSP 938, the UE 908 may not be able to detect and decode the MSI 950. As the UE 908 has determined that the transmission of the file segment 922 had completed in the $(i+2)^{th}$ MSP 936, the UE 908 can determine that the current MSP (i.e., the $(i+3)^{th}$ MSP 938) is within the MSPs that do not have the MCH 951 carrying the eMBMS service data. Accordingly, the UE 908 may decide not to perform blind decoding for the subframes in the $(i+3)^{th}$ MSP 938.

Within the procedure 1010-c, the UE, at operation 1116, detects a DCI format of a first subframe of the one or more subframes. At operation 1118, the UE determines the first transmission mode used to transmit the first subframe based on the detected DCI format. At operation 1120, the UE detects that the first transmission mode matches a reference transmission mode. In certain configurations, the reference transmission mode is Transmission Mode 9 or Transmission Mode 10. For example, referring to FIG. 9, the UE 908 may not be able to detect and decode the MSI 950 in the $(i+3)^{th}$ MSP 938. The UE 908 may detect that the PDCCH of a particular subframe in the $(i+3)^{th}$ MSP 938 uses DCI format 2C or 2D corresponding to Transmission Mode 9 or Transmission Mode 10. The UE 908 may determine that the particular subframe is part of the subframes 952 allocated for the MCH 951. The UE 908 may also determine that the eNodeB 904 has reallocated the particular subframe to unicast transmission because the eNodeB 904 has completed the transmission of the file segment 922. Accordingly, the UE 908 can decide to abort the blind decoding.

Figure 12:
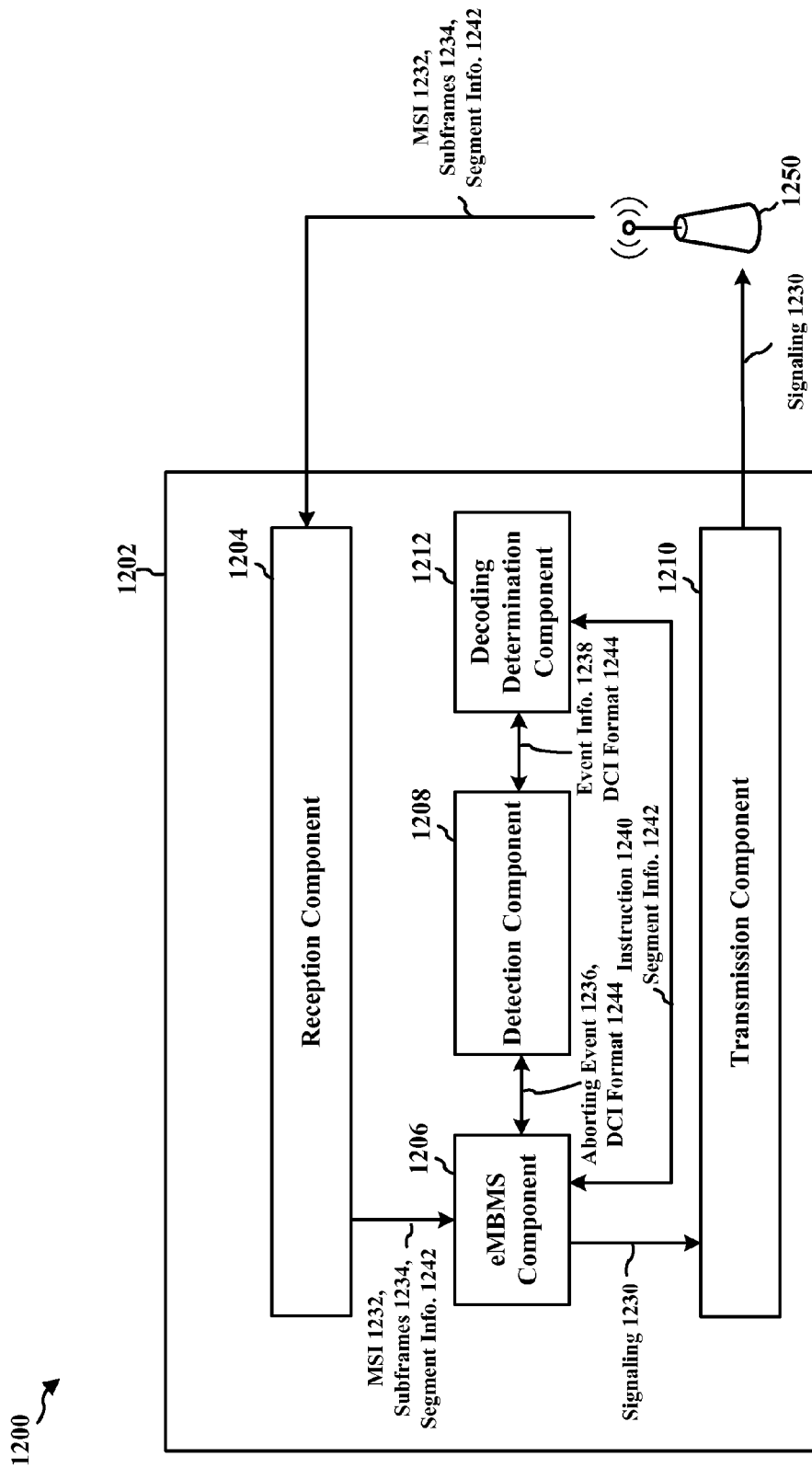
FIG. 12 is a conceptual data flow diagram illustrating the data flow between different means/components in an exemplary apparatus.

FIG. 12 is a conceptual data flow diagram 1200 illustrating the data flow between different components/means in an exemplary apparatus 1202. The apparatus may be a UE. The apparatus includes a reception component 1204, an eMBMS component 1206, a detection component 1212, a decoding determination component 1208, and a transmission component 1210. The detection component 1212 and the decoding determination component 1208 may constitute the eMBMS decoding management component 152 and the eMBMS decoding management component 252.

In certain configurations, an eNodeB 1250 transmits an MSI 1232 for a first MSP to the apparatus 1202/1202'. The eMBMS component 1206 may be configured to optionally send signaling 1230 to the eNodeB 1250 via the transmission component 1210. The eMBMS component 1206 may be configured to determine a failure to receive the MSI 1232 for the first MSP. The eNodeB 1250 transmits one or more subframes 1234 to the apparatus 1202/1202'. The reception component 1204 may be configured to receive the subframes 1234 and to send the subframes 1234 to the eMBMS component 1206. The eMBMS component 1206 may be configured to attempt to decode one or more subframes 1234 in the first MSP. The detection component 1212 may be configured to detect an occurrence of an MSP abort decoding event 1236 from the eMBMS component 1206. The detection component 1212 sends event information 1238 about the MSP abort decoding event 1236 to the decoding determination component 1208. The decoding determination component 1208 may be configured to determine that the first MSP does not include any subframe 1234 that carries MBMS data of an MBMS segment based on the detection of the MSP abort decoding event 1236. Accordingly, the decoding determination component 1208 may be configured to send to the eMBMS component 1206 instruction 1240 that instructs the eMBMS component 1206 to abort the attempt to decode the one or more subframes 1234.

In certain configurations, detecting an occurrence of the MSP abort decoding event 1236 includes detecting: (a) that a failure to decode N subframes 1234 of the one or more subframes 1234 occurs, (b) that a signal strength of each subframe 1234 of the N subframes 1234 does not meet a threshold, N being an integer greater than 1, (c) that the first MSP is in the MBMS segment and is subsequent to a final MSP that includes a subframe 1234 carrying MBMS data of the MBMS segment, or (d) that a first transmission mode used to transmit a first subframe 1234 of the one or more subframes 1234 matches a reference transmission mode, or any combination thereof. In certain configurations, the failure to decode the each subframe 1234 of the N subframes 1234 occurs when no signal is detected in the each subframe 1234 of the N subframes 1234. In certain configurations, each of N and the threshold is a function of an MBSFN allocation in the first MSP, a duration of a PMCH in the first MSP, or a combination thereof.

In certain configurations, the transmission component 1210 may be configured to receive MBMS segment information 1242 from the eNodeB 1250. The transmission component 1210 may be configured to send the MBMS segment information 1242 to the eMBMS component 1206. The decoding determination component 1208 may be configured to obtain the MBMS segment information 1242 from the eMBMS component 1206. The decoding determination component 1208 may be configured to determine that the first MSP is in the MBMS segment based on the MBMS segment information 1242.

In certain configurations, to determine that the first MSP is in the MBMS segment, the decoding determination component 1208 may be configured to determine a duration of the MBMS segment based on the MBMS segment information 1242. The decoding determination component 1208 may be also configured to determine a duration of each MSP in the MBMS segment. The decoding determination component 1208 may be configured to determine that the first MSP is in the MBMS segment based on the duration of the MBMS segment and the duration of the each MSP.

In certain configurations, the detection component 1212 may be configured to detect a DCI format 1244 of the first subframe 1234. The detection component 1212 may be configured to send the DCI format 1244 to the decoding determination component 1208. The decoding determination component 1208 may be configured to determine the first transmission mode based on the detected DCI format 1244. In certain configurations, the reference transmission mode is Transmission Mode 9 or Transmission Mode 10.

In certain configurations, the reception component 1204 may be configured to receive an MSI 1232 for a second MSP that is prior to and consecutive to the first MSP. The decoding determination component 1208 may be configured to determine that the second MSP does not include any subframe 1234 that carries MBMS data of the MBMS segment based on the MSI 1232 for the second MSP. The detection of the occurrence of the MSP abort decoding event 1236 is performed in response to the determination that the second MSP does not include any subframe 1234 that carries MBMS data of the MBMS segment. In certain configurations, the second MSP is the final MSP and the first MSP is subsequent to the final MSP.

The apparatus may include additional components that perform each of the blocks of the algorithm in the aforementioned flowcharts of FIGS. 10-11. As such, each block in the aforementioned flowcharts of FIGS. 10-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
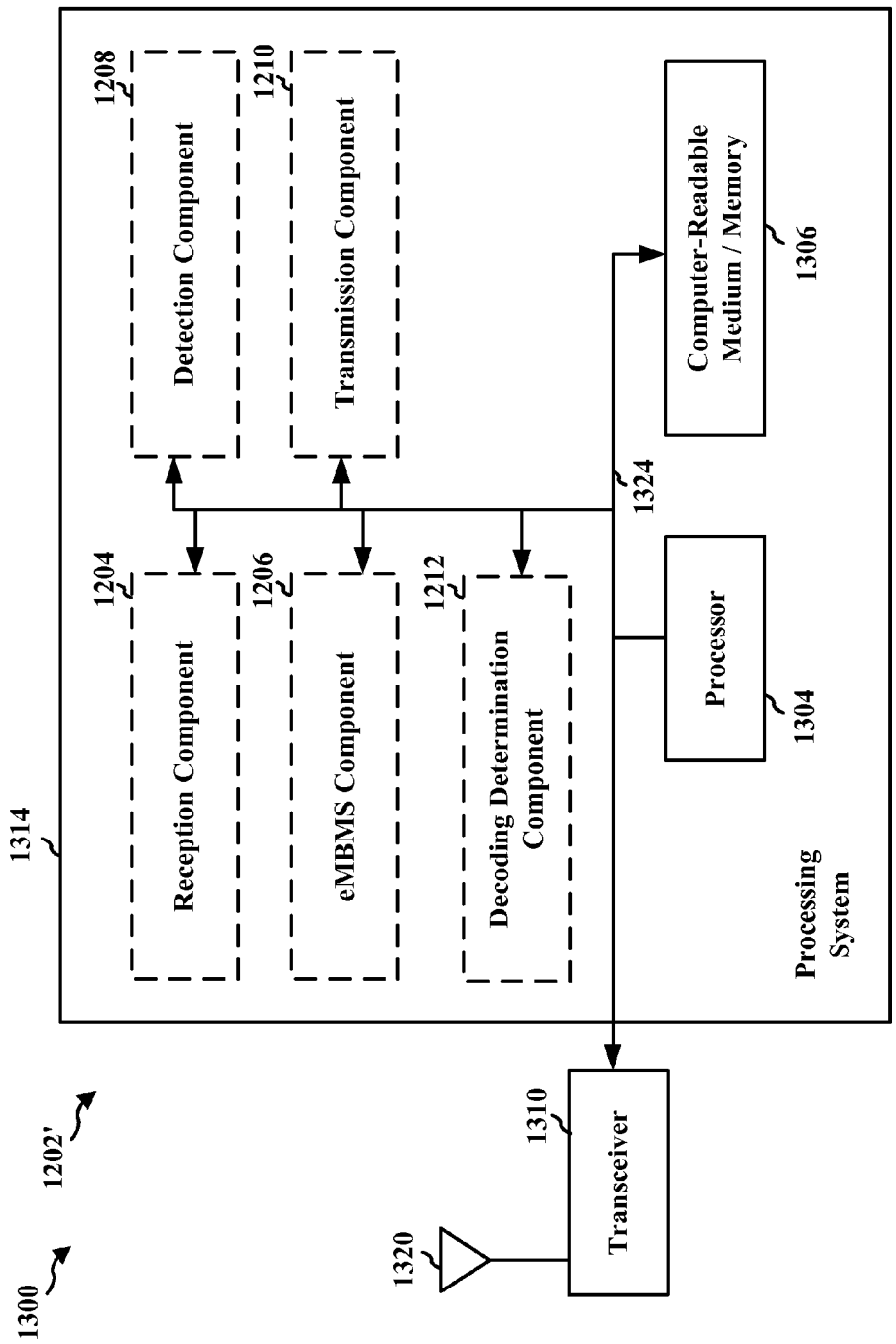
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1210, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system further includes at least one of the components 1204, 1206, 1208, 1210, 1212. The components may be software components running in the processor 1304, resident/stored in the computer readable medium/memory 1306, one or more hardware components coupled to the processor 1304, or some combination thereof. The processing system 1314 may be a component of the UE 650 and may include the memory 660 and/or at least one of the TX processor 668, the RX processor 656, and the controller/processor 659.

In certain configurations, the apparatus 1202/1202' may be configured to include means for determining a failure to receive a multicast channel (MCH) scheduling information (MSI) for a first MCH scheduling period (MSP). The apparatus 1202/1202' may be configured to include means for attempting to decode one or more subframes in the first MSP. The apparatus 1202/1202' may be configured to include means for detecting an occurrence of an MSP abort decoding event. The apparatus 1202/1202' may be configured to include means for determining that the first MSP does not include any subframe that carries multimedia broadcast multicast service (MBMS) data of an MBMS segment based on the detection of the MSP abort decoding events. The apparatus 1202/1202' may be configured to include means for aborting the attempt to decode the one or more subframes.

In certain configurations, the means for detecting an occurrence of the MSP abort decoding event is further configured to detect: (a) that a failure to decode N subframes of the one or more subframes occurs, (b) that a signal strength of each subframe of the N subframes does not meet a threshold, N being an integer greater than 1, (c) that the first MSP is in the MBMS segment and is subsequent to a final MSP that includes a subframe carrying MBMS data of the MBMS segment, or (d) that a first transmission mode used to transmit a first subframe of the one or more subframes matches a reference transmission mode, or any combination thereof.

In certain configurations, the failure to decode the each subframe of the N subframes occurs when no signal is detected in the each subframe of the N subframes. In certain configurations, each of N and the threshold is a function of a MBSFN allocation in the first MSP, a duration of a PMCH in the first MSP, or a combination thereof.

In certain configurations, the apparatus 1202/1202' may be configured to include means for receiving MBMS segment information. The apparatus 1202/1202' may be configured to include means for determining that the first MSP is in the MBMS segment based on the MBMS segment information. In certain configurations, the means for determining that the first MSP is in the MBMS segment is further configured to: (a) determine a duration of the MBMS segment based on the MBMS segment information, (b) determine a duration of each MSP in the MBMS segment, and (c) determine that the first MSP is in the MBMS segment based on the duration of the MBMS segment and the duration of the each MSP.

In certain configurations, the apparatus 1202/1202' may be configured to include means for detecting a DCI format of the first subframe. The apparatus 1202/1202' may be configured to include means for determining the first transmission mode based on the detected DCI format. In certain configurations, the reference transmission mode is Transmission Mode 9 or Transmission Mode 10.

In certain configurations, the apparatus 1202/1202' may be configured to include means for receiving an MSI for a second MSP that is prior to and consecutive to the first MSP. The apparatus 1202/1202' may be configured to include means for determining that the second MSP does not include any subframe that carries MBMS data of the MBMS segment based on the MSI for the second MSP. The detection of the occurrence of the MSP abort decoding event is performed in response to the determination that the second MSP does not include any subframe that carries MBMS data of the MBMS segment. In certain configurations, the second MSP is the final MSP and the first MSP is subsequent to the final MSP.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a user equipment (UE), comprising:
    determining a failure to receive a multicast channel (MCH) scheduling information (MSI) for a first MCH scheduling period (MSP);
    attempting to decode one or more subframes in the first MSP;
    detecting an occurrence of an MSP abort decoding event;
    determining that the first MSP does not include any subframe that carries multimedia broadcast multicast service (MBMS) data of a MBMS segment based on the detection of the MSP abort decoding event; and
    aborting the attempt to decode the one or more subframes.

2. The method of claim 1, wherein the detecting the occurrence of the MSP abort decoding event comprises detecting:
    that a failure to decode N subframes of the one or more subframes occurs;
    that a signal strength of each subframe of the N subframes does not meet a threshold, N being an integer greater than 1;
    that the first MSP is in the MBMS segment and is subsequent to a final MSP that includes a subframe carrying MBMS data of the MBMS segment; or
    that a first transmission mode used to transmit a first subframe of the one or more subframes matches a reference transmission mode, or any combination thereof.

3. The method of claim 2, wherein the failure to decode the each subframe of the N subframes occurs when no signal is detected in the each subframe of the N subframes.

4. The method of claim 2, wherein each of N and the threshold is a function of a multicast-broadcast single frequency network (MBSFN) allocation in the first MSP, a duration of a physical multicast channel (PMCH) in the first MSP, or a combination thereof.

5. The method of claim 2, further comprising:
    receiving MBMS segment information; and
    determining that the first MSP is in the MBMS segment based on the MBMS segment information.

6. The method of claim 5, wherein the determining that the first MSP is in the MBMS segment includes:
    determining a duration of the MBMS segment based on the MBMS segment information;
    determining a duration of each MSP in the MBMS segment; and
    determining that the first MSP is in the MBMS segment based on the duration of the MBMS segment and the duration of the each MSP.

7. The method of claim 2, further comprising:
    detecting a downlink control information (DCI) format of the first subframe; and
    determining the first transmission mode based on the detected DCI format.

8. The method of claim 7, wherein the reference transmission mode is Transmission Mode 9 or Transmission Mode 10.

9. The method of claim 2, further comprising:
    receiving an MSI for a second MSP that is prior to and consecutive to the first MSP; and
    determining that the second MSP does not include any subframe that carries MBMS data of the MBMS segment based on the MSI for the second MSP, wherein the detection of the occurrence of the MSP abort decoding event is performed in response to the determination that the second MSP does not include any subframe that carries MBMS data of the MBMS segment.

10. The method of claim 9, wherein the second MSP is the final MSP and the first MSP is subsequent to the final MSP.

11. An apparatus for wireless communication, the apparatus being a user equipment (UE), comprising:
    means for determining a failure to receive a multicast channel (MCH) scheduling information (MSI) for a first MCH scheduling period (MSP);
    means for attempting to decode one or more subframes in the first MSP;
    means for detecting an occurrence of an MSP abort decoding event;
    means for determining that the first MSP does not include any subframe that carries multimedia broadcast multicast service (MBMS) data of a MBMS segment based on the detection of the MSP abort decoding event; and
    means for aborting the attempt to decode the one or more subframes.

12. The apparatus of claim 11, wherein the means for detecting the occurrence of the MSP abort decoding event is further configured to detect:
    that a failure to decode N subframes of the one or more subframes occurs;
    that a signal strength of each subframe of the N subframes does not meet a threshold, N being an integer greater than 1;
    that the first MSP is in the MBMS segment and is subsequent to a final MSP that includes a subframe carrying MBMS data of the MBMS segment; or
    that a first transmission mode used to transmit a first subframe of the one or more subframes matches a reference transmission mode, or any combination thereof.

13. The apparatus of claim 12, wherein the failure to decode the each subframe of the N subframes occurs when no signal is detected in the each subframe of the N subframes.

14. The apparatus of claim 12, wherein each of N and the threshold is a function of a multicast-broadcast single frequency network (MBSFN) allocation in the first MSP, a duration of a physical multicast channel (PMCH) in the first MSP, or a combination thereof.

15. The apparatus of claim 12, further comprising:
means for receiving MBMS segment information; and
means for determining that the first MSP is in the MBMS segment based on the MBMS segment information.

16. The apparatus of claim 15, wherein the means for determining that the first MSP is in the MBMS segment is further configured to:
determine a duration of the MBMS segment based on the MBMS segment information;
determine a duration of each MSP in the MBMS segment; and
determine that the first MSP is in the MBMS segment based on the duration of the MBMS segment and the duration of the each MSP.

17. The apparatus of claim 12, further comprising:
means for detecting a downlink control information (DCI) format of the first subframe; and
means for determining the first transmission mode based on the detected DCI format.

18. The apparatus of claim 17, wherein the reference transmission mode is Transmission Mode 9 or Transmission Mode 10.

19. The apparatus of claim 12, further comprising:
means for receiving an MSI for a second MSP that is prior to and consecutive to the first MSP; and
means for determining that the second MSP does not include any subframe that carries MBMS data of the MBMS segment based on the MSI for the second MSP, wherein the detection of the occurrence of the MSP abort decoding event is performed in response to the determination that the second MSP does not include any subframe that carries MBMS data of the MBMS segment.

20. The apparatus of claim 19, wherein the second MSP is the final MSP and the first MSP is subsequent to the final MSP.

21. An apparatus for wireless communication, the apparatus being a user equipment (UE), comprising:
a memory; and
at least one processor coupled to the memory and configured to:
determine a failure to receive a multicast channel (MCH) scheduling information (MSI) for a first MCH scheduling period (MSP);
attempt to decode one or more subframes in the first MSP;
detect an occurrence of an MSP abort decoding event;
determine that the first MSP does not include any subframe that carries multimedia broadcast multicast service (MBMS) data of a MBMS segment based on the detection of the MSP abort decoding event; and
abort the attempt to decode the one or more subframes.

22. The apparatus of claim 21, wherein to detect the occurrence of the MSP abort decoding event, the at least one processor is further configured to detect:
that a failure to decode N subframes of the one or more subframes occurs;
that a signal strength of each subframe of the N subframes does not meet a threshold, N being an integer greater than 1;
that the first MSP is in the MBMS segment and is subsequent to a final MSP that includes a subframe carrying MBMS data of the MBMS segment; or
that a first transmission mode used to transmit a first subframe of the one or more subframes matches a reference transmission mode, or any combination thereof.

23. The apparatus of claim 22, wherein the failure to decode the each subframe of the N subframes occurs when no signal is detected in the each subframe of the N subframes.

24. The apparatus of claim 22, wherein each of N and the threshold is a function of a multicast-broadcast single frequency network (MBSFN) allocation in the first MSP, a duration of a physical multicast channel (PMCH) in the first MSP, or a combination thereof.

25. The apparatus of claim 22, wherein the at least one processor is further configured to:
receive MBMS segment information; and
determine that the first MSP is in the MBMS segment based on the MBMS segment information.

26. The apparatus of claim 25, wherein to determine that the first MSP is in the MBMS segment, the at least one processor is further configured to:
determine a duration of the MBMS segment based on the MBMS segment information;
determine a duration of each MSP in the MBMS segment; and
determine that the first MSP is in the MBMS segment based on the duration of the MBMS segment and the duration of the each MSP.

27. The apparatus of claim 22, wherein the at least one processor is further configured to:
detect a downlink control information (DCI) format of the first subframe; and
determine the first transmission mode based on the detected DCI format.

28. The apparatus of claim 27, wherein the reference transmission mode is Transmission Mode 9 or Transmission Mode 10.

29. The apparatus of claim 22, wherein the at least one processor is further configured to:
receive an MSI for a second MSP that is prior to and consecutive to the first MSP; and
determine that the second MSP does not include any subframe that carries MBMS data of the MBMS segment based on the MSI for the second MSP, wherein the detection of the occurrence of the MSP abort decoding event is performed in response to the determination that the second MSP does not include any subframe that carries MBMS data of the MBMS segment.

30. A non-transitory computer-readable medium storing computer executable code for wireless communication at a user equipment (UE), comprising code for:
determining a failure to receive a multicast channel (MCH) scheduling information (MSI) for a first MCH scheduling period (MSP);
attempting to decode one or more subframes in the first MSP;
detecting an occurrence of an MSP abort decoding event;
determining that the first MSP does not include any subframe that carries multimedia broadcast multicast service (MBMS) data of a MBMS segment based on the detection of the MSP abort decoding event; and
aborting the attempt to decode the one or more subframes.

* * * * *